United States Patent [19]
Stenkvist

[11] 3,985,945
[45] Oct. 12, 1976

[54] DIRECT-CURRENT ARC FURNACE

[75] Inventor: Sven-Einar Stenkvist, Vasteras, Sweden

[73] Assignee: Allmanna Svenska Elektriska Aktiebolaget, Vasteras, Sweden

[22] Filed: Apr. 30, 1975

[21] Appl. No.: 573,357

[30] Foreign Application Priority Data
May 21, 1974 Sweden............................ 7406715

[52] U.S. Cl........................................ 13/11; 13/10
[51] Int. Cl.²........................................ H05B 7/20
[58] Field of Search.............................. 13/10, 11

[56] References Cited
UNITED STATES PATENTS
1,626,263    4/1927    Brooke ......................... 13/10 X Primary Examiner—R. N. Envall, Jr.
Attorney, Agent, or Firm—Kenyon & Kenyon Reilly Carr & Chapin

[57] ABSTRACT

An electric arc furnace has an anodic contact or hearth electrode and a cathodic arcing electrode, and the furnace is rotative about its vertical axis while the arcing electrode remains stationary in its lateral direction. With a melt in the furnace, the DC arc can be directed in different angular directions with respect to the inside of the furnace.

1 Claim, 3 Drawing Figures

U.S. Patent  Oct. 12, 1976  3,985,945

DIRECT-CURRENT ARC FURNACE

The present invention relates to a DC arc furnace having a furnace vessel and at least one consumable electrode.

In an arc furnace supplied with direct current through a contact electrode in an electrode pocket at the periphery of the furnace, or at the side of the furnace vessel or at the outer edge of the furnace bottom, the arc is influenced by the electromagnetic current forces so that it becomes oblique in a direction facing away from the contact electrode. An example is provided by U.S. Pat. No. 3,835,230, dated Sept. 10, 1974.

This situation, which is sometimes considered a problem, has been taken advantage of in the present invention, and the invention refers to an arc furnace construction which utilizes this fact. The furnace vessel in the furnace according to the invention is arranged to be rotatable around a vertical axis with a view to controlling the arc.

In a preferred embodiment of the invention the furnace is also arranged to be tiltable around a horizontal axis.

Figure 1:
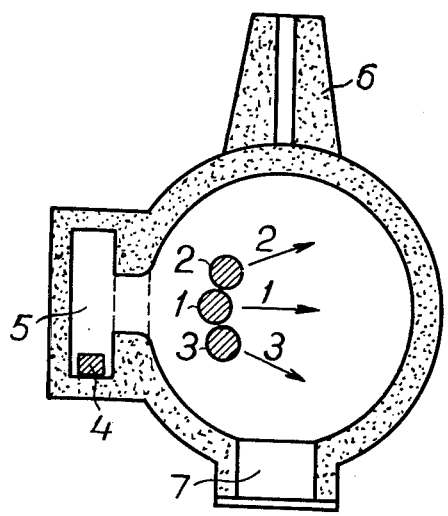
Figure 2:
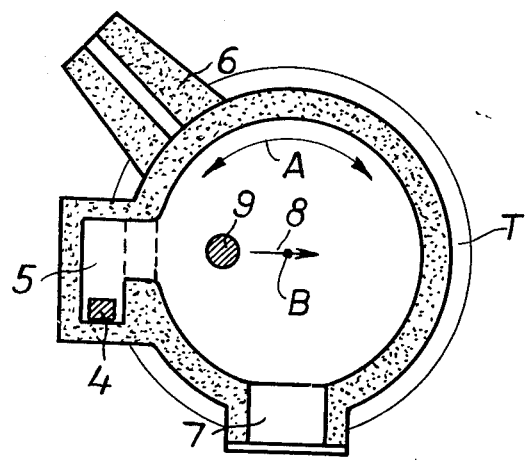
Figure 3:
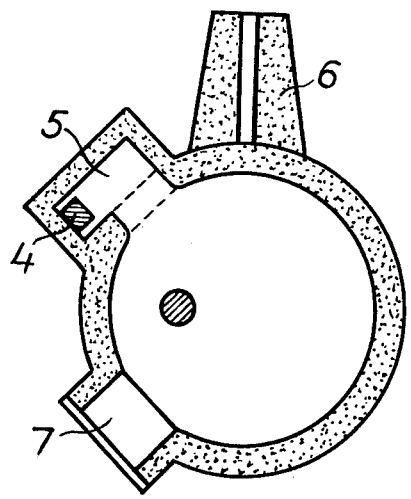

The furnace is exemplified in greater detail in the accompanying drawing, in which FIG. 1 shows the furnace vessel of a DC arc furnace, and the electrode seen from above, in a horizontal cross section, FIG. 2 in similar cross section, shows a modification and FIG. 3 the same furnace somewhat rotated about its axis.

Numeral 1 in FIG. 1 shows the normal position for an arcing electrode and the arrow 1 shows the resulting direction of the arc at that position in the case of a DC arc furnace having an offset melt-contact electrode. The contact electrode 4 is shown in an electrode pocket 5, and the arc tends to deviate in the direction of the arrow 1 because the contact electrode is oppositely offset from the arcing electrode 1. 2 indicates another position of the arcing electrode, which is obtained after rotating the furnace around its vertical axis. 6 is the pouring spout of the furnace. 3 is another electrode position and the arrows 2 and 3 indicate the respective directions of deviation of the arc which are obtained when the furnace has been rotated to those positions. The device for rotating the furnace vessel in relation to the arc and the electrode is a construction which is known per se and which is used in many plants, but the purpose of the rotation is in this case to direct the maximum melting effect inside the furnace with a view to affecting the melting process. The different positions 1, 2 and 3 can thus be used to achieve different directions of the melting process, mainly with the maximum effect acting in the direction of the arrow. This rotation is especially favourable in DC furnaces of this kind, and in the example shown in FIG. 1 the rotation of the vessel is ± 30°.

In the patent application mentioned in the introduction there is mentioned the possibility of displacing the electrode pocket asymmetrically towards the tapping side of the furnace in order to obtain, in connection with the tapping, a quantity of melt to secure a good contact with the subsequent charge. The disadvantage with this location of the electrode, however, is that the electromagnetic current forces affect the arc so that said arc and the hot gases emanating therefrom are directed closer to the slag opening 7. The possibility of controlling the direction of the arc by rotating the vessel, as shown in FIG. 1, will however, substantially solve this problem. In FIGS. 2 and 3 two further measures are proposed, combined with an unconventional location of the slag opening 7 of the furnace, namely so that the slag opening 7 and the tapping spout 6 do not lie on the same symmetry axis through the furnace vessel, and in this way it is possible to achieve ideal conditions in an arc furnace supplied with direct current. FIG. 2 shows a furnace according to this proposal in a normal operating position. The arc flame 8 from the electrode 9 (graphite electrode or Soderberg electrode) is driven right across the furnace and does not disturb the conditions near the slag opening 7. During deslagging the furnace is tilted backwards to a horizontal tilting axis in a conventional manner. For tapping the furnace, the vessel is rotated according to FIG. 3 so that the tapping spout 6 is in the right position (FIG. 3). The electrode pocket 5 will then assume such a position that it remains filled with melt which is to make contact at the next charge.

If the furnace is arranged so that it can be placed in a position tilting slightly forwards with the electrode removed (not shown), the next charge is suitably inserted with the furnace in such a tilting position that the scrap tends to fall inwards towards the electrode pocket 5 and establish contact.

It can also be advantageous to commence the melting with the furnace directed according to FIG. 3 and tilting slightly forwards, the new melt at an early stage finding its way into the electrode pocket and establishing contact. As the melt level rises the furnace can be tilted backwards to the horizontal position, and at the same time the vessel is again rotated (see FIG. 1) successively towards the normal operating position according to FIG. 2. The DC arc furnace according to the above can be varied in many ways within the scope of the following claims.

It can be seen from FIG. 2 that the furnace vessel can be supported on a plain turntable T which is rotative about the axis B of the furnace vessel, the arrow A indicating that the furnace can be rotated in either direction about its vertical axis B. The means for tilting the furnace is not shown because it can be entirely conventional, it being necessary to tilt all electric arc furnaces.

I claim:

1. A DC arc furnace comprising a furnace vessel having a lower portion for containing a melt, a cathodic arcing electrode positioned to form an arc on the melt in said portion, and an anodic contact electrode positioned for contact with said melt at a position laterally offset from said arcing electrode and arc, said furnace vessel being rotative about its vertical axis and said arcing electrode being fixed stationary in a lateral direction, whereby rotation of said vessel causes angular deflections of said arc in different lateral directions.

* * * * *